US012228052B2

(12) United States Patent
Mangardich et al.

(10) Patent No.: US 12,228,052 B2
(45) Date of Patent: Feb. 18, 2025

(54) INTEGRALLY BLADED ROTOR WITH INCREASED RIM BENDING STIFFNESS

(71) Applicant: PRATT & WHITNEY CANADA CORP., Longueuil (CA)

(72) Inventors: Dikran Mangardich, Richmond Hill (CA); Krishna Prasad Balike, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/354,714

(22) Filed: Jul. 19, 2023

(65) Prior Publication Data

US 2025/0027420 A1 Jan. 23, 2025

(51) Int. Cl.
*F01D 5/34* (2006.01)
*F01D 5/06* (2006.01)

(52) U.S. Cl.
CPC ................. *F01D 5/34* (2013.01); *F01D 5/06* (2013.01); *F05D 2220/323* (2013.01); *F05D 2240/80* (2013.01); *F05D 2260/94* (2013.01)

(58) Field of Classification Search
CPC ........... F05D 2220/32; F05D 2220/323; F05D 2260/96; F05D 2240/80; F05D 2260/94; F05D 2260/941; F05D 2230/50; F01D 5/34; F01D 5/027; F01D 5/10; F01D 11/001; F01D 5/06; F01D 5/147; F01D 5/02; F01D 5/082; F01D 5/14; F04D 29/324; F04D 29/329; F04D 29/388; F04D 29/662; F04D 29/668
See application file for complete search history.

(56) References Cited

U.S. PATENT DOCUMENTS

| | | | | |
|---|---|---|---|---|
| 8,888,458 | B2 * | 11/2014 | Billings | F04D 29/662 416/144 |
| 9,410,436 | B2 | 8/2016 | Kulathu et al. | |
| 9,638,049 | B2 * | 5/2017 | Dupeyre | F01D 11/006 |
| 9,803,481 | B2 * | 10/2017 | Aiello | F01D 5/02 |
| 10,443,502 | B2 | 10/2019 | Edwards | |
| 10,858,957 | B2 * | 12/2020 | Perez | F01D 25/243 |
| 10,995,768 | B2 * | 5/2021 | Johann | F01D 5/3061 |
| 2013/0156584 | A1 | 6/2013 | Anderson et al. | |

* cited by examiner

*Primary Examiner* — Eric J Zamora Alvarez
(74) *Attorney, Agent, or Firm* — NORTON ROSE FULBRIGHT CANADA LLP

(57) ABSTRACT

An integrally bladed rotor for an aircraft engine includes a hub and a circumferential array of blades extending from the hub. Each blade has an airfoil extending from a gaspath side of a platform provided at a periphery of the hub. The platform has a radial thickness T. An edge of the airfoil is disposed at an axial distance $L_1$ from an adjacent axial edge of the platform. A projection extends radially inwardly from an interior side of the platform opposite to the gaspath side. The projection has an axial thickness t, a radial height h from the interior side of the platform, and an axial distance $L_2$ from the adjacent axial edge of the platform. T is a radial thickness of the platform at an axial location of the projection, and $$0.2 \le \frac{T}{t} \le 5;\ 1 \le \frac{h}{t} \le 10;\ \text{and}\ 0 \le \frac{L_2}{L_1} \le 10.$$

18 Claims, 4 Drawing Sheets

INTEGRALLY BLADED ROTOR WITH INCREASED RIM BENDING STIFFNESS

TECHNICAL FIELD

The disclosure relates generally to aircraft engines and, more particularly, to integrally bladed rotors for aircraft engines.

BACKGROUND

Aircraft rotor assemblies rotate at extreme speeds and may be subjected to various stresses associated with low-cycle-fatigue (LCF), for instance due to centrifugal and thermal loads, and vibratory stresses associated with high-cycle-fatigue (HCF) occurring at resonance conditions. Such stresses may inadvertently lead to damage such as crack formation and propagation on the blades of the rotor, possibly to the rotor hub. It is thus desirable to reduce the risk of crack formation and propagation.

SUMMARY

In one aspect, there is provided an integrally bladed rotor for an aircraft engine, comprising: a hub; a circumferential array of blades extending from the hub, each blade having an airfoil extending from a gaspath side of a platform provided at a periphery of the hub, the platform having a radial thickness T, an edge of the airfoil disposed at an axial distance $L_1$ from an adjacent axial edge of the platform; and a projection extending radially inwardly from an interior side of the platform opposite to the gaspath side, the projection having an axial thickness t, a radial height h from the interior side of the platform, and an axial distance $L_2$ from the adjacent axial edge of the platform; wherein T is a radial thickness of the platform at an axial location of the projection; and wherein $$0.2 \leq \frac{T}{t} \leq 5;\ 1 \leq \frac{h}{t} \leq 10;\ \text{and}\ 0 \leq \frac{L_2}{L_1} \leq 10.$$

In another aspect, there is provided an aircraft engine, comprising: a shaft rotatable about an axis; and an integrally bladed rotor mounted to the shaft for rotation therewith, the integrally bladed rotor including: a hub having a radially outer rim, the radially outer rim having a gaspath side and an interior side opposite to the gaspath side; a circumferential array of blades extending from the gaspath side of the radially outer rim; and a rib extending radially inwardly from the interior side of the radially outer rim, the rim axially aligned with one of a leading edge and a trailing edge of the circumferential array of blades, wherein:

$$0.2 \leq \frac{T}{t} \leq 5;\ 1 \leq \frac{h}{t} \leq 10;$$

and wherein Tis a radial thickness of the radially outer rim at a location of the rib, tis an axial thickness of the rib, and h a radial height of the rib from the interior side of the radially outer rim.

In a further aspect, there is provided integrally bladed rotor for an aircraft engine, comprising: a one-piece body including a plurality of blades extending integrally from a gaspath side of a platform, and a rib projecting integrally from an interior side of the platform opposite to the gaspath side; wherein:

$$0.5 \leq \frac{T}{t} \leq 3;\ 2 \leq \frac{h}{t} \leq 8;\ \text{and}\ 2 \leq \frac{L_2}{L_1} \leq 8;$$

and wherein T is a radial thickness of the platform at an axial location of the rib, t is an axial thickness of the rib, h a radial height of the rib from the interior side of the platform, $L_1$ is an axial distance from a leading edge of the plurality of blades to an adjacent leading edge of the platform, and $L_2$ is an axial distance from the rib to the leading edge of the platform.

BRIEF DESCRIPTION OF THE DRAWINGS

Reference is now made to the accompanying figures in which.

DETAILED DESCRIPTION

Figure 1:
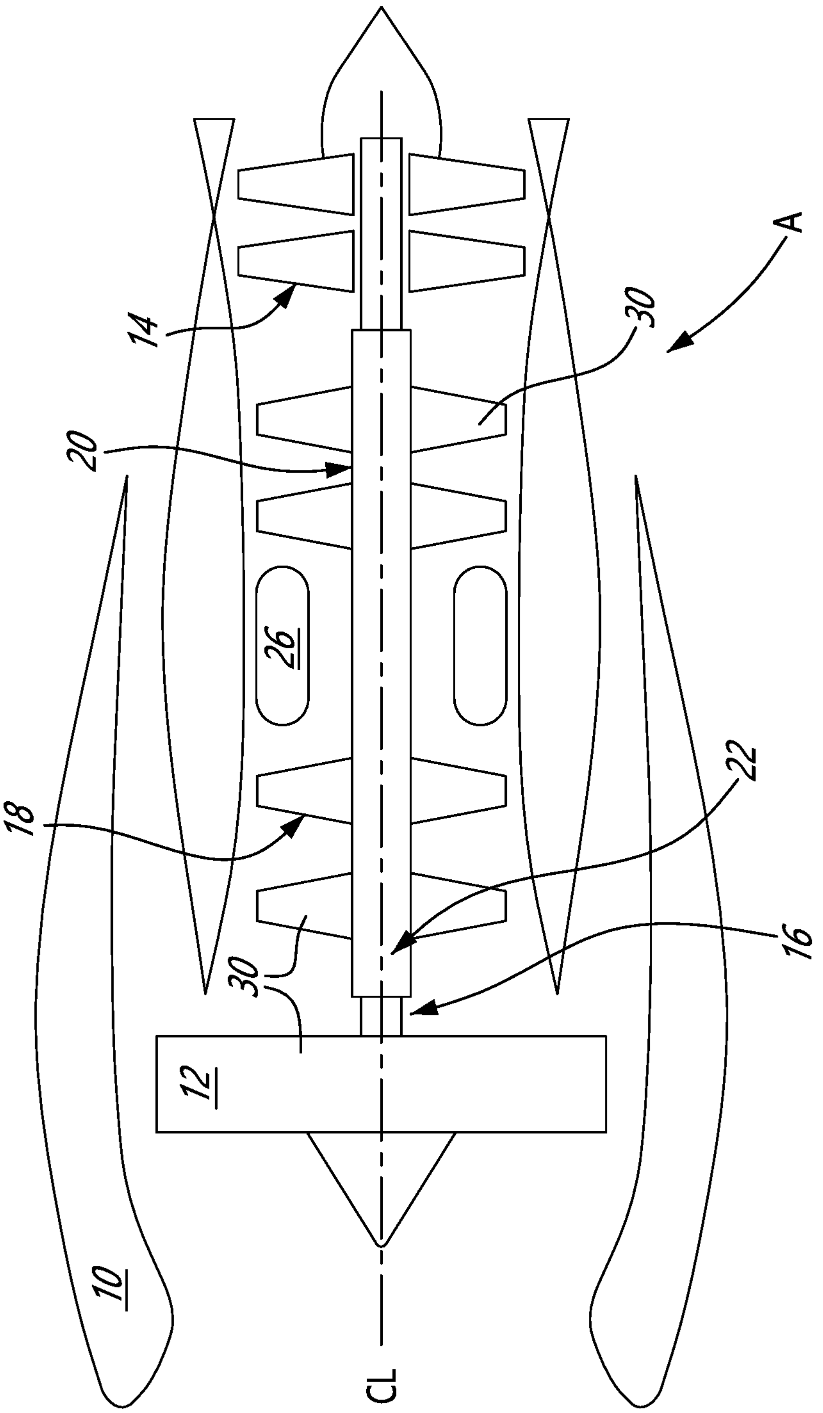
FIG. 1 is a schematic cross sectional view of a gas turbine engine.

FIG. 1 schematically depicts a turbofan engine A which, as an example, illustrates the application of the described subject matter. The turbofan engine A includes a nacelle 10, a low pressure spool assembly which includes at least a fan 12 and a low pressure turbine 14 connected by a low pressure shaft 16, and a high pressure spool which includes a high pressure compressor 18 and a high pressure turbine 20 connected by a high pressure shaft 22, extending about a central longitudinal axis CL. The engine A further comprises a combustor 26. The fan 12, the high pressure compressor 18, the high pressure turbine 20 and the low pressure turbine 14, for the purposes of the present description include rotors represented by the blades 30 in FIG. 1. While FIG. 1 illustratively depicts engine A as a turbofan engine, other types of gas turbine engines, as well as hybrid-electric engines, may be contemplated.

Figure 2:
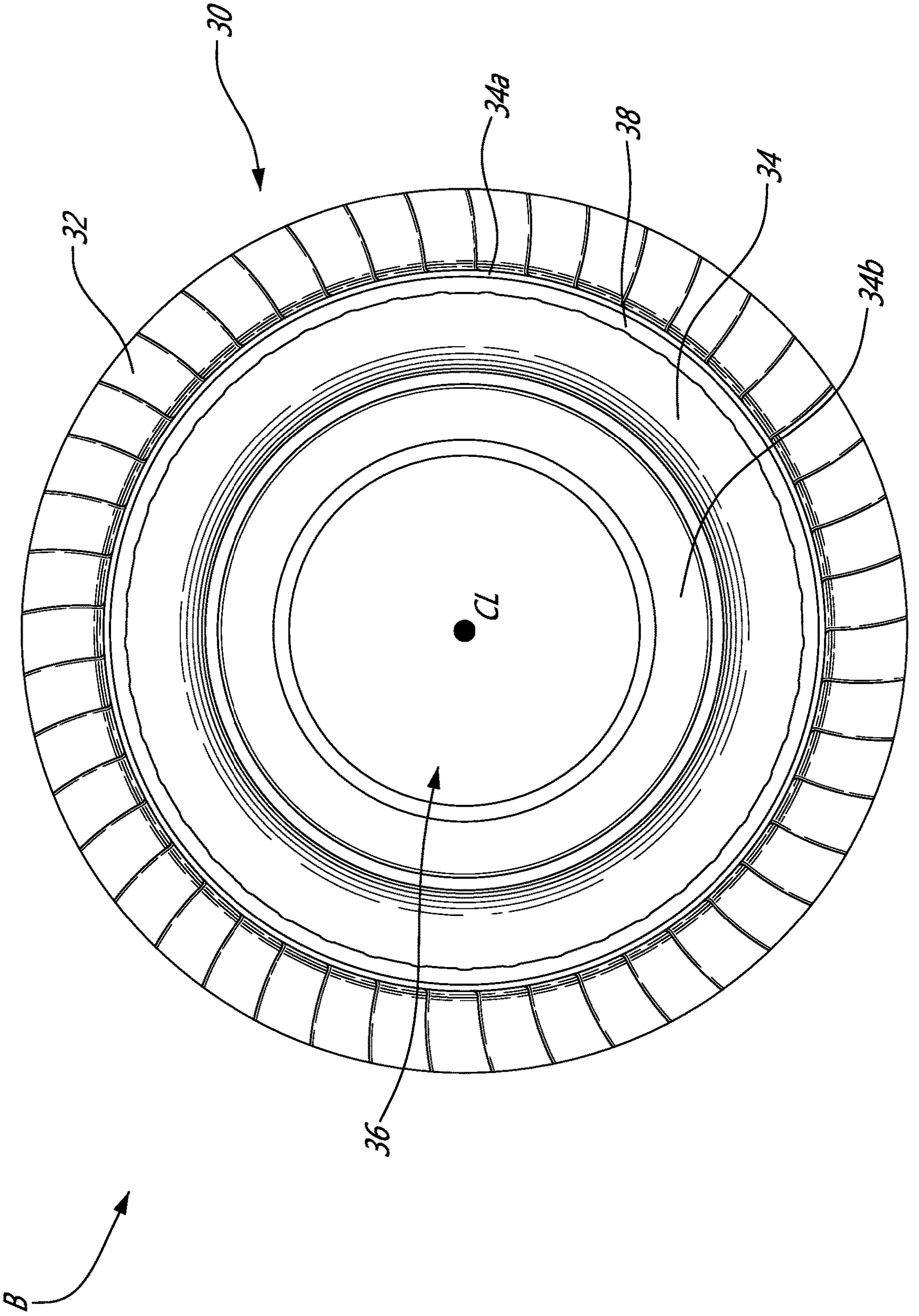
FIG. 2 is a side view of a rotor for the engine of FIG. 1, according to an embodiment of the present disclosure.
Figure 3:
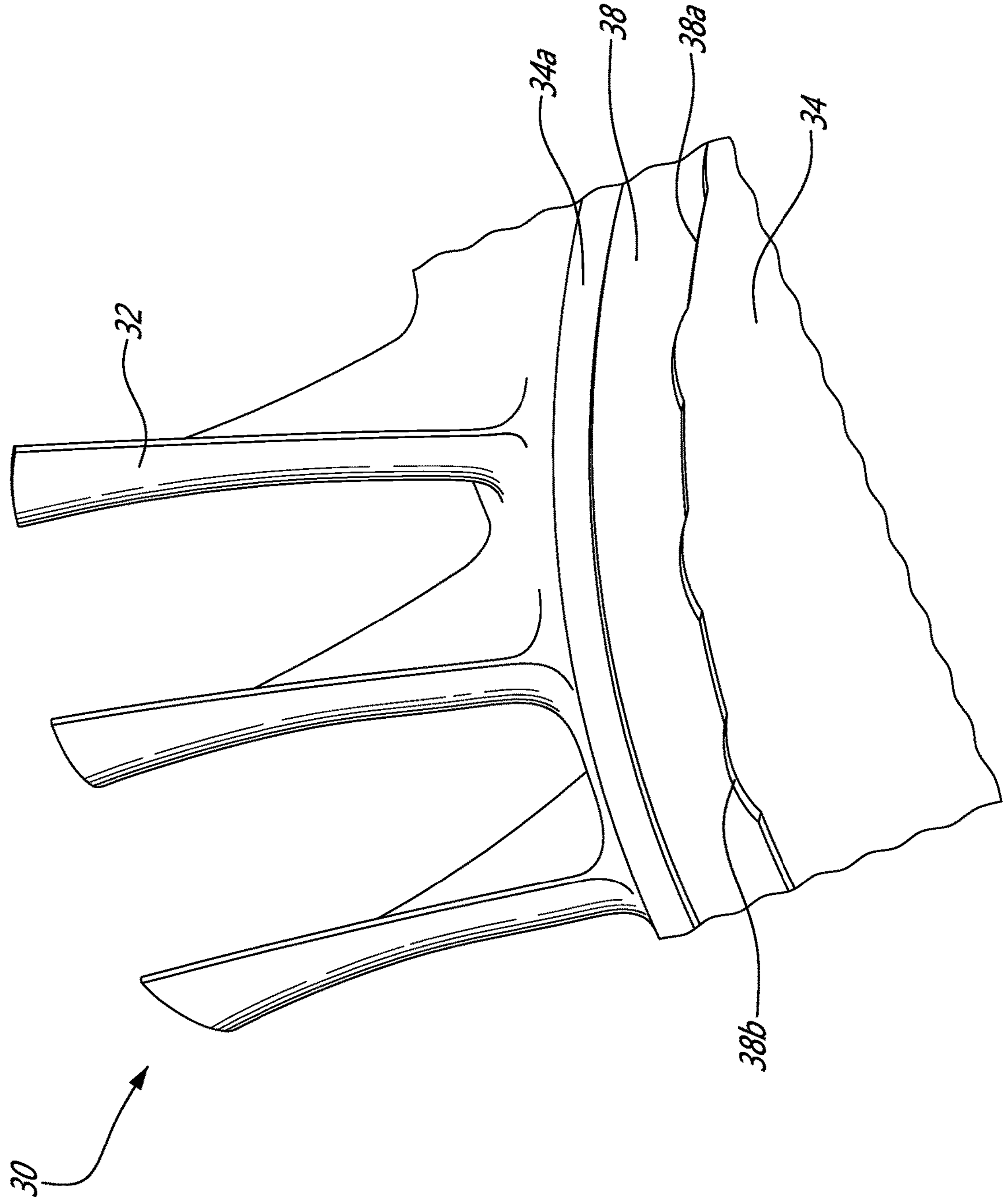
FIG. 3 is an enhanced front view of the rotor of FIG. 2.

The rotors, for instance the fan 12 or the high pressure compressor 18, may be provided in the form of blisks, that is, in the form of integrally bladed rotors (IBR). Referring to FIGS. 2 and 3, a rotor B for engine A is shown. Rotor B may, for instance, be high pressure compressor 18, although other rotors of engine A may be contemplated, such as fan 12, high pressure turbine 20, or low pressure turbine 14. Rotor B includes a circumferential array of blades 30 integrally formed with and extending from a rotor hub 34 in a unitary construction. Each blade 30 comprises an airfoil 32 extending from a gas path side (shown in FIGS. 2 and 3) of an annular platform 34*a*, also referred to as a rim, formed at the periphery of the rotor hub 34. The number and shape of the blades 30 may vary, for instance based on the engine A type and/or rotor B type. The hub 34 includes a radially inner portion 34*b* with a central bore 36 configured for mounting to an engine shaft, for instance low pressure shaft 16 or high pressure shaft 22.

Figure 4:
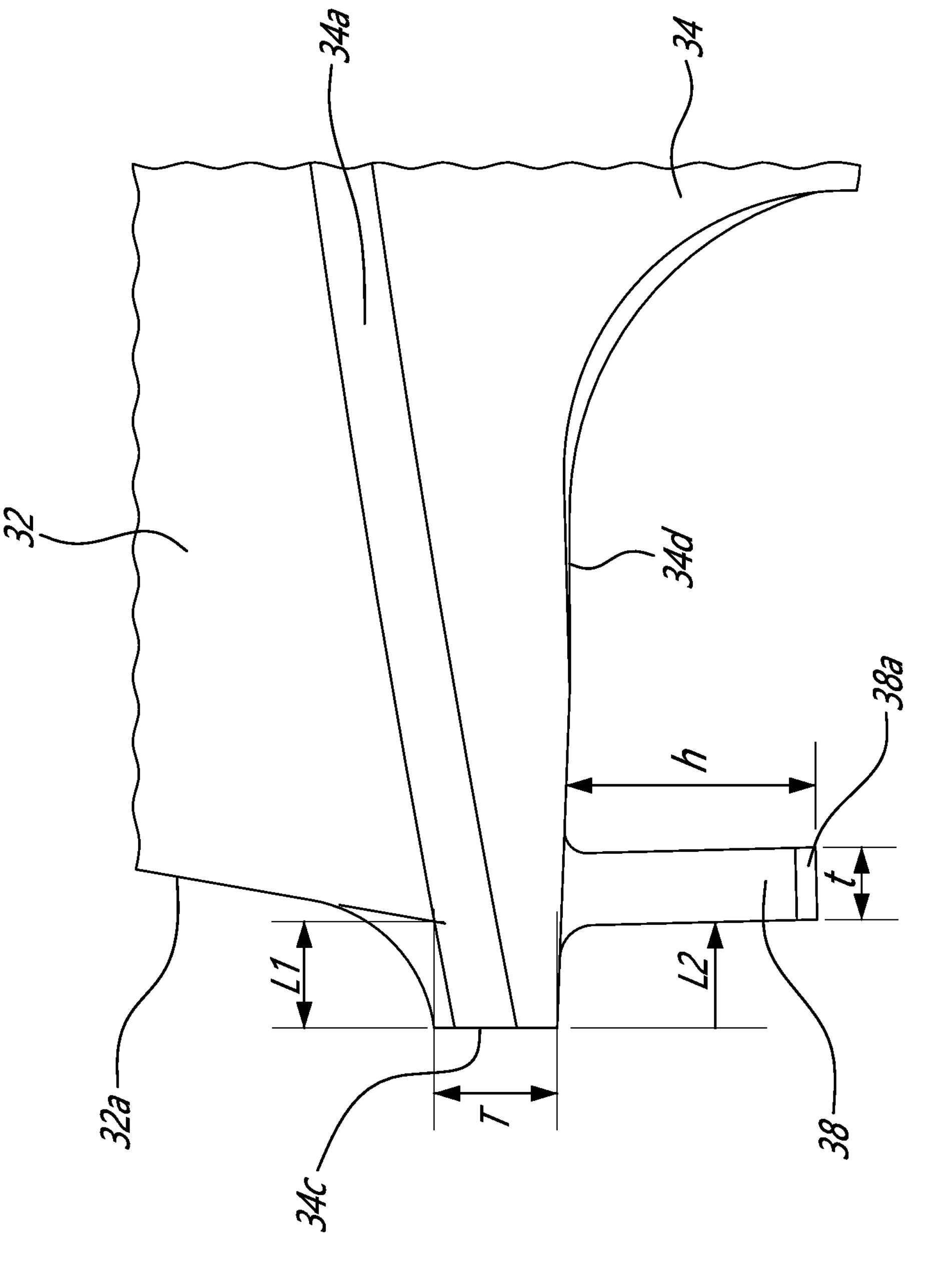
FIG. 4 is an enhanced side view of the rotor of FIG. 2.

As the rotor B rotates about the axis CL, various loads may cause damage to its various components. For instance, low-cycle fatigue (LCF) loads such as centrifugal forces and thermal loads, and high-cycle fatigue (HCF) loads such as dynamic loading occurring at resonance conditions due to aerodynamic excitation may undesirably cause cracks in the blades 30. In an integrally bladed rotor such as rotor B, additional concerns may result if the cracks in the blades 30 were to propagate to the hub 34. Additionally or alternatively, cracks may initiate and/or propagate on the hub 34 itself, for instance due to interactions between LCF and HCF loads, and/or due to foreign object damage (FOD). Referring to FIGS. 3 and 4, to address this and other concerns, a projection 38, also referred to as a stiffening rib, extends radially inwardly from an interior side 34*d* of the platform 34*a*. As will be discussed in further detail below, the projection 38 is configured for increasing the bending stiffness of the platform 34*a*, thereby reducing the risk of crack formation and propagation in the rotor B. By increasing the bending stiffness at areas susceptible to crack formation and/or propagation (e.g., at the base of an airfoil 32), the bending stresses ensuing from HCF-derived modes may be minimized, reducing the risk that the crack would form and/or propagate. The projection 38 may be disposed beneath or adjacent a critical location of the rotor B (i.e., where a crack is most likely to form), thereby providing additional stiffness where it may needed most.

Referring to FIG. 4, the stiffening rib or projection 38 is shown to be spaced axially inwardly from a front edge 34*c* of the platform 34*a* and is axially aligned with a leading edge 32*a* of the airfoil 32. According some applications, a projection 38 could be similarly disposed underneath the trailing edge of the airfoil 32 at an axial distance inboard from the aft edge of the platform 34*a*. In some cases, such projections or ribs may extend in a direction generally normal to the interior side of the platform 34*a*, although other directions may be contemplated. Various shapes and sizes of the projection 38 are contemplated. In the shown case, the platform 34*a* has a local radial thickness Tat the axial location of the projection 38. The leading edge 32*a* of the airfoil 32 meets the platform 34*a* at an axial distance $L_1$ from the front edge 34*c* of the platform 34*a*. The projection 38 has an axial thickness t, a radial height h from the interior side 34*d* of the platform 34*a*, and an axial distance $L_2$ from the front edge 34*c* of platform 34*a*. In cases where the axial thickness t of the projection varies (e.g., tapers) along its radial height h, the axial thickness t may refer to its average axial thickness, although other reference thicknesses (e.g., its maximum axial thickness) may be contemplated.

To provide the platform 34*a* with the desired additional stiffness to mitigate crack formation and/or crack propagation, the projection 38 may respect the following ranges for the following ratios:

$$0.2 \le \frac{T}{t} \le 5$$

$$1 \le \frac{h}{t} \le 10$$

$$0 \le \frac{L_2}{L_1} \le 10$$

In various embodiments, the projection 38 may additionally respect one or more of the following sub-ranges:

$$0.5 \le \frac{T}{t} \le 3.$$

-continued $$2 \le \frac{h}{t} \le 8.$$

$$2 \le \frac{L_2}{L_1} \le 8.$$

Other nested sub-ranges for the above parameters and ratios may be contemplated.

With regards to the ratio T/t, the radial thickness T of the platform 34*a* may be said to be an independent parameter of a given rotor B, whereas the axial thickness t of the projection 38 may be subsequently selected based on the radial thickness T for a pre-selected stiffness of the platform 34*a*. As such, a T/t ratio below 0.2 may result in a platform 34*a* with an increased stiffness but a non-negligible weight increase, thereby potentially minimizing the practicality of the projection 38. On the other hand, a T/t ratio above 5 may result in a lighter projection 38, albeit potentially providing less stiffness gain than desired. A T/t ratio between 0.2 and 5 may thus provide a balance between weight gain and increased stiffness. Other ranges may be contemplated, for instance based on the number and type of projections 38 and the selected materials.

With regards to the ratio h/t, an h/t ratio below 1 may, in some applications, provide a minimal increase in stiffness to the platform 34*a*, whereas an h/t ratio above 10 may create a discernable weight increase. A h/t ratio between 1 and 10 may thus provide a balance between weight gain and increased stiffness. Other ranges may be contemplated, for instance based on the number and type of projections 38 and the selected materials.

With regards to the ratio $L_2/L_1$, the additional stiffness may be provided where a crack is most likely to initiate, which may be at the $L_1$ location. As such, a $L_2/L_1$ ratio of approximately 1 (i.e., the projection 38 axially aligned with the leading edge 32*a* of the airfoil 32) may provide adequate stiffness to the platform 34*a*. In other cases, the location where stress concentrations would be highest may vary (for instance, based on the size and/or shape of the airfoil), and as such the preferred $L_2/L_1$ ratio may vary from 0 (i.e., the projection 38 axially disposed at the edge 34*c* of the platform 34*a*) to 10 (i.e., the projection 38 disposed near a web of the hub 34). Other $L_2/L_1$ ratios may be contemplated, for instance based on the number and type of projections 38 and the selected materials.

The projection 38 may be integrally formed with the platform 34*a*. In the shown embodiment, the projection 38 is circumferentially continuous about the inner side 34*d* of the platform 34*a*. Cutouts 38*b*, illustratively circumferentially spaced-apart scalloped-shaped cutouts 38*b*, may be provided in the radially inner edge of the projection 38 for increased balancing and/or reduced weight. Additionally or alternatively, one or more axial through holes may be provided through the projection 38. The circumferential locations of the cutouts 38*b* (or holes) may be selected, for instance, to be misaligned with the blades 30 (i.e., circumferentially disposed between adjacent blades 30), for instance to ensure full projection 38 thickness (and thus structural integrity) at the locations of the blades 30. In other embodiments, a plurality of circumferentially spaced apart projections 38 (for instance, identically sized and shaped projections 38) may be provided in annular alignment, interrupted by circumferential voids or spaces. In such embodiments, the projections 38 may be circumferentially aligned with the blades 30 so as to provide structural reinforcement at the circumferential locations of the blades 30. Other locations for the projections 38 and the voids may be contemplated.

In other embodiments, two or more rows of projections 38, i.e., axially spaced apart from one another from the edge 34*c* of the platform 34*a*, may be provided. The rows of projections 38 may be configured to provide additional stiffness at desired locations of the platform 34*a*. In some embodiments, a first row of projections 38 may be continuous about its circumference, while a second row of projections 38 may include a plurality of circumferentially spaced apart projections 38 in annular alignment, interrupted by voids or spaces. Oher combinations of continuous and non-continuous projections 38 may be contemplated.

In accordance with one or more embodiments of the present disclosure, there is provided a method for increasing the stiffness of an integrally bladed rotor B for an aircraft engine A. The integrally bladed rotor B includes a circumferential array of blades 30 extending from a hub 34, each blade 30 having an airfoil 32 extending from a gaspath side of a platform 34*a* provided at a periphery of the hub 34, the platform 34*a* having a radial thickness T, an edge 32*a* of the airfoil 32 disposed at an axial distance $L_1$ from an adjacent axial edge 34*c* of the platform 34*a*. The method includes providing a projection 38 extending radially inwardly from an interior side 34*d* of the platform 34*a*, the projection 38 having an axial thickness t, a radial height h from the interior side 34*d* of the platform 34*a*, and an axial distance $L_2$ from the adjacent axial edge 34*c* of the platform 34*d*, wherein $$0.2 \le \frac{T}{t} \le 5,\ 1 \le \frac{h}{t} \le 10, \text{ and } 0 \le \frac{L_2}{L_1} \le 10.$$

In the present disclosure, when a specific numerical value is provided (e.g. as a maximum, minimum or range of values), it is to be understood that this value or these ranges of values may be varied, for example due to applicable manufacturing tolerances, material selection, etc. As such, any maximum value, minimum value and/or ranges of values provided herein (such as, for example only, the above-noted ranges for the ratios T/t, h/t and $L_2/L_1$), include(s) all values falling within the applicable manufacturing tolerances. Accordingly, in certain instances, these values may be varied by ±5%. In other implementations, these values may vary by as much as ±10%. A person of ordinary skill in the art will understand that such variances in the values provided herein may be possible without departing from the intended scope of the present disclosure, and will appreciate for example that the values may be influenced by the particular manufacturing methods and materials used to implement the claimed technology.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An integrally bladed rotor for an aircraft engine, comprising:
   a hub;
   a circumferential array of blades extending from the hub, each blade having an airfoil extending from a gaspath side of a platform provided at a periphery of the hub, an edge of the airfoil disposed at an axial distance $L_1$ from an adjacent axial edge of the platform; and
   a projection extending radially inwardly from an interior side of the platform opposite to the gaspath side, the projection having an axial thickness t, a radial height h from the interior side of the platform, and an axial distance $L_2$ from the adjacent axial edge of the platform;
   wherein T is a radial thickness of the platform at an axial location of the projection; and
   wherein $$0.2 \le \frac{T}{t} \le 5;$$

$$1 \le \frac{h}{t} \le 10; \text{ and}$$

$$2 \le \frac{L_2}{L_1} \le 8.$$

2. The integrally bladed rotor as defined in claim 1, wherein $$0.5 \le \frac{T}{t} \le 3.$$

3. The integrally bladed rotor as defined in claim 1, wherein $$2 \le \frac{h}{t} \le 8.$$

4. The integrally bladed rotor as defined in claim 1, wherein the projection extends uninterruptedly about a circumference of the interior side of the platform.

5. The integrally bladed rotor as defined in claim 1, wherein the projection includes one or more cutouts defined in a radially inner edge of the projection.

6. The integrally bladed rotor as defined in claim 5, wherein the one or more cutouts are scallops.

7. The integrally bladed rotor as defined in claim 5, wherein the one or cutouts are circumferentially disposed between adjacent blades of the circumferential array of blades.

8. The integrally bladed rotor as defined in claim 1, wherein the integrally bladed rotor is a high pressure compressor rotor for the aircraft engine.

9. An aircraft engine, comprising:
   a shaft rotatable about an axis; and
   an integrally bladed rotor mounted to the shaft for rotation therewith, the integrally bladed rotor including:
      a hub having a radially outer rim, the radially outer rim having a gaspath side and an interior side opposite to the gaspath side;
      a circumferential array of blades extending from the gaspath side of the radially outer rim; and
      a rib extending radially inwardly from the interior side of the radially outer rim, the rim axially aligned with one of a leading edge and a trailing edge of the circumferential array of blades,
      wherein:

$$0.2 \leq \frac{T}{t} \leq 5; \text{ and}$$

$$1 \leq \frac{h}{t} \leq 10;$$

wherein T is a radial thickness of the radially outer rim at a location of the rib, t is an axial thickness of the rib, and h is a radial height of the rib from the interior side of the radially outer rim;

wherein the one of the leading edge or the trailing edge of the circumferential array of blades is disposed at an axial distance $L_1$ from an adjacent axial edge of the radially outer rim, the rib axially spaced from the adjacent axial edge of the radially outer rim by an axial distance $L_2$ and wherein $$2 \leq \frac{L_2}{L_1} \leq 8.$$

10. The aircraft engine as defined in claim 9, wherein $$0.5 \leq \frac{T}{t} \leq 3.$$

11. The aircraft engine as defined in claim 9, wherein $$2 \leq \frac{h}{t} \leq 8.$$

12. The aircraft engine as defined in claim 9, wherein the rib extends uninterruptedly about a circumference of the interior side of the radially outer rim.

13. The aircraft engine as defined in claim 9, wherein the rib includes one or more cutouts defined in a radially inner edge of the rib.

14. The aircraft engine as defined in claim 13, wherein the one or more cutouts are scallops.

15. The aircraft engine as defined in claim 13, wherein the one or cutouts are circumferentially disposed between adjacent blades of the circumferential array of blades.

16. The aircraft engine as defined in claim 9, wherein the aircraft engine comprises a compressor section and a turbine section, and wherein the integrally bladed rotor is part of the compressor section.

17. An integrally bladed rotor for an aircraft engine, comprising:

a one-piece body including a plurality of blades extending integrally from a gaspath side of a platform, and a rib projecting integrally from an interior side of the platform opposite to the gaspath side;

wherein:

$$0.5 \leq \frac{T}{t} \leq 3;$$

$$2 \leq \frac{h}{t} \leq 8; \text{ and}$$

$$2 \leq \frac{L_2}{L_1} \leq 8;$$

and wherein T is a radial thickness of the platform at an axial location of the rib, t is an axial thickness of the rib, h is a radial height of the rib from the interior side of the platform, $L_1$ is an axial distance from a leading edge of the plurality of blades to a leading edge of the platform, and $L_2$ is an axial distance from the rib to the leading edge of the platform.

18. The integrally bladed rotor of claim 17, wherein the rib extends circumferentially uninterruptedly along the interior side of the platform, and wherein circumferentially spaced-apart scallops are defined in a radially inner edge of the rib, the circumferentially spaced-apart scallops disposed between adjacent blades of the plurality of blades.

* * * * *